July 20, 1948.    F. D. SNYDER    2,445,460
DYNAMIC BRAKING SYSTEM
Filed Feb. 21, 1947

WITNESSES:

INVENTOR
Frederick D. Snyder.
BY
ATTORNEY

Patented July 20, 1948

2,445,460

UNITED STATES PATENT OFFICE 2,445,460

DYNAMIC BRAKING SYSTEM

Frederick D. Snyder, Milton, Mass., assignor to Westinghouse Electric Corporation, East Pittsburgh, Pa., a corporation of Pennsylvania Application February 21, 1947, Serial No. 730,149

7 Claims. (Cl. 318—154)

My invention relates to variable voltage drives of the series type and it has for its main object to devise a control system for very rapid deceleration of such drives by dynamic braking.

Another object of the invention is to provide a variable-voltage series-type drive system capable of rapid braking, in which the variable voltage generator of the system remains positively driven and provides a braking field for the motor during the decelerating period of the motor.

Still another object of my invention, in conjunction with the foregoing, is the provision of a control system for variable voltage drives in which the dynamic braking effort is dependent upon the previously effective speed setting of the system so that a correspondingly stronger braking field is effective in the motor when the drive was operating at higher speeds.

In order to achieve these objects and in accordance with one of the features of my invention, I provide a variable voltage drive of the series type with a dynamic braking resistor under control by a voltage responsive relay; and I energize this relay, after the actuation of a stop control contact, by regenerative voltage from the motor armature while I change the generator circuit to include only the field winding but not the armature of the motor. As a result, the regenerative voltage of the motor causes the voltage-responsive relay to connect the braking resistor across the motor armature as long as this voltage is above a minimum value. According to another feature, the voltage-responsive relay is interlocked with the auxiliary constant-speed drive for the generator of the drive system so that the generator is stopped, upon actuation of the stop control contact, only after the subsequent lapse of a braking interval.

These and other objects and features of my invention will be apparent from the embodiment illustrated in the drawing and described hereafter.

Figure 1:
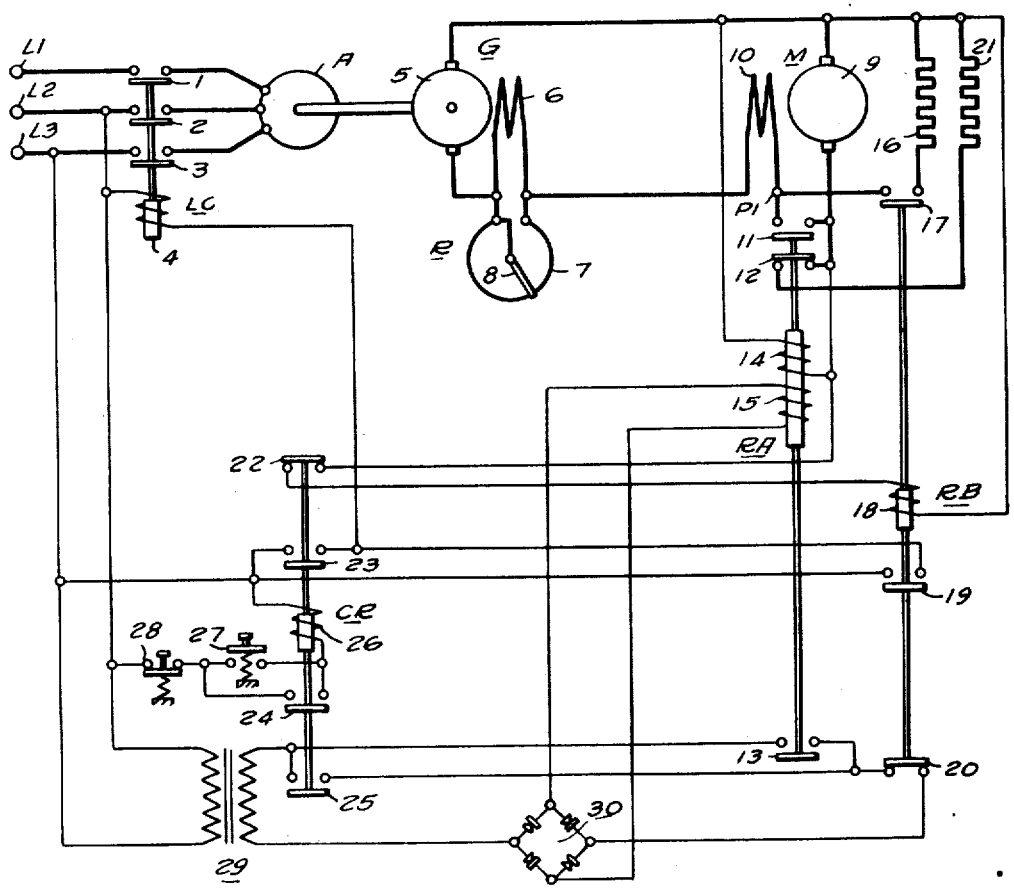
Fig. 1 represents diagrammatically a variable voltage drive and appertaining control system according to the invention.

According to Fig. 1, a variable-speed direct-current motor M is energized from a generator G which is driven at substantially constant speed from an alternating current motor A. Motor A is energized from line terminals L1, L2 and L3 under control by respective contacts 1, 2 and 3 of a line contactor LC whose control coil is denoted by 4. The armature 5 of the generator G is series connected with the appertaining generator field winding 6, and the latter is parallel-connected to a rheostat R whose resistor and slide contact are denoted by 7 and 8, respectively. The setting of the slide contact 8, selected by the operator, determines the speed of the motor M and, as will be explained below, also the braking effort caused in the motor during the interval of deceleration. The armature 9 of motor M and the appertaining field winding 10 are arranged for series connection with the generator armature 5 and field winding 6 under control by a contact 11 of a relay RA which has also two interlock contacts 12 and 13 controlled by two coils 14 and 15. Relay RA is of a known and commercially available double-throw type. It picks up and closes the contact 11 when the bottom coil 15 is energized. A subsequent energization of top coil 14, with coil 15 remaining excited, is insufficient to drop the relay, but when thereafter the bottom coil 15 becomes deenergized, the top coil 14 will cause a rapid dropping out of the relay.

A field resistor 16 is at one end connected to the generator armature circuit at a point P1 disposed between the motor field winding 10 and the relay contact 11. This connection, however, is controlled by the main contact 17 of a voltage relay RB whose control coil 18 actuates also two interlock contacts 19 and 20. The other end of the field resistor 16 is in permanent connection with the motor armature 9. A braking resistor 21 is disposed across the motor armature 9 under control by the contact 12 of relay RA. The control coil 18 of the voltage relay RB is also connected across the motor armature 9, but this connection is controlled by the contact 22 of a control relay CR. Relay CR has three interlock contacts 23, 24 and 25. The appertaining control coil 26 is connected across the line terminals L2 and L3 under control by a normally open start contact 27 and a normally closed stop contact 28. Any desired number of stop contacts may be provided in series connection with each other. For instance, when the drive is used for operating a weaving loom or other textile machine, the stop contacts may be controlled by feeler switches or the like protective devices in order to initiate the very rapid braking and stopping of the machinery in response to the occurrence of a yarn break or other fault. A transformer 29, also connected across line terminals L2 and L3, serves to energize a rectifier 30 which, in turn, provides energization for the bottom coil 15 of relay RA under control by the above-mentioned contacts 13, 20 and 25.

Figure 2:
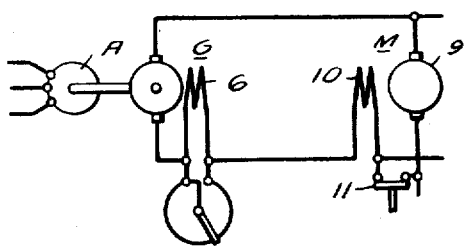
Fig. 2 represents the generator motor circuit of the same system set up for running the drive motor.

When the start contact 27 is closed, the coil 26 is energized so that the control relay CR picks up. Contact 24 then closes and shorts the start contact 27 in order to maintain for coil 26 a self-holding circuit when thereafter the start contact 27 is released. Contact 23 of relay CR completes the circuit of coil 4 so that the line contactor LC also closes in order to start the motor A. Contact 25 of relay CR closes and applies excitation to coil 15 of relay RA. As a result, contact 11 closes and completes the generator motor circuit of the variable voltage drive. Due to the opening of contact 22 in relay CR, the voltage relay RB remains disconnected from the motor armature 9. Under the conditions then reached, the two resistors 16 and 21 are disconnected from the motor and generator circuits, and the circuit connections then existing correspond to the diagram of Fig. 2. The motor M will now accelerate to the desired speed as selected by the setting of the rheostat R.

If now the stop contact 28, or one of the stop contacts is opened, for instance, by one of the above-mentioned protective devices of the machinery driven by the motor M, the circuit of coil 26 is opened so that the control relay CR drops out. Contact 23 then opens the circuit of coil 4 so that the line contactor LC drops also out. At the same instant, the closing of contact 22 places excitation across the coil 18 of the voltage relay RB which then closes the contact 19 and thereby reenergizes the contactor coil 4. Hence, the dropping out of contactor LC is temporary and of very short duration so that the motor A and generator G continue running. The voltage relay RB, by closing its contact 17, connects the resistor 16 in the generator circuit in series with the motor field winding 10. Due to the opening of contact 20, the bottom coil of relay RA becomes deenergized so that under the then effective excitation of coil 14, the latter relay drops out rapidly and disconnects the motor armature 9 from the generator circuit while connecting at contact 12, the braking resistor 21 across the motor armature 9. The circuit conditions then established are separately shown in Fig. 3.

Figure 3:
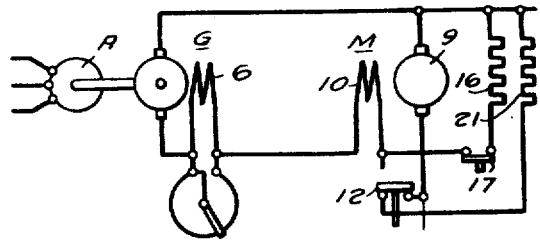
Fig. 3 is a straight line diagram of the generator and motor circuits of the same system automatically set up during the braking interval.

According to Fig. 3 the field resistor 16 maintains the generator circuit closed while the motor armature 9 is excluded from this circuit. Consequently, during the interval following the actuation of the stop contact, the generator G operates to apply a braking field to the motor M. Since this field is dependent upon the setting of the rheostat R, the field strength is in accordance with the speed at which the motor was previously running; that is, if the motor speed was high, the braking field is likewise high and if the speed was low, the braking field is correspondingly reduced. The motor M then acts as a generator, and the regenerative current flowing through the braking resistor 17 produces dynamic braking. As a result, the speed of the drive is rapidly decelerated. When the motor is almost at rest, that is, when its speed is reduced to such an extent that the load on the motor will stop it quickly without further braking torque, the regenerative voltage drops below the value at which the voltage relay RB remains picked up. Relay RB will then drop out and, at contact 19, interrupt the circuit for contactor coil 4. Consequently, the contactor LC now disconnects the alternating current motor A so that the whole drive becomes dead and assumes the initial condition for starting as illustrated in Fig. 1.

It will be recognized from the foregoing description that the direct current generator G remains positively driven during the braking period so that the direct current motor field is assured throughout the braking performance. It is likewise apparent that the current flowing through the motor series field winding 10 is higher for a high speed setting on the speed control rheostat R thus providing increased braking torque at higher motor speeds. Lastly, the system secures the continuance of the braking performance regardless of the time needed for placing the driven machinery at rest due to the voltage responsive action of the relay RB and its association with the other controlling elements of the system.

While I have illustrated and described a series-type variable-voltage drive, it should be understood that the invention can also be applied to variable-voltage drives of the conventional shunt-field type provided the drive motor, aside from its shunt field, is also equipped with a series field to be used only for dynamic braking in accordance with the above-disclosed principles of my invention. It will also be understood by those skilled in the art that control systems according to my invention can be modified and altered as regards other details without foregoing the objects and advantages of the invention and within the scope of the essential features of the invention as set forth in the claims annexed hereto.

I claim as my invention:

1. An electric drive system, comprising a direct-current drive motor to operate at adjustable speed having an armature and a field winding, an adjustable-voltage generator having an armature and a field winding series-connected with said armature and said field winding of said motor, first contact means disposed between said field winding and said armature of said motor to disconnect them from each other when said contact means is open, constant-speed drive means for driving said generator armature, control means connected with said drive means and having a start contact and a stop contact, a field resistor, second contact means for connecting when closed said field resistor in series with said generator armature and said generator and motor field windings, a braking resistor, third contact means for connecting when closed said braking resistor across said motor armature, a voltage relay connected across said motor armature so as to cause said control means to maintain said drive means running for a braking interval after the actuation of said stop contact until said motor armature ceases regenerating a sufficient voltage to keep said relay picked up, and means linking said first, second and third contact means with said control means and said relay so as to open said first contact means and close said second and third contact means during said interval in response to the actuation of said stop contact and under control by said relay.

2. An electric drive system, comprising a direct-current drive motor to operate at adjustable speed having an armature and a field winding, an adjustable-voltage generator having an armature and a field winding arranged for series connection to said generator armature and generator field winding, circuit means including a voltage-responsive relay and having contacts for connecting said motor armature and motor field winding in series to said generator armature and generator field winding when said relay is in dropped condition while series-connecting said motor field winding close to said generator armature and generator field winding when said relay is in picked-up condition, another motor in driving connection with said generator armature, control means disposed for controlling said other motor and having contact means for closing starting connections for said other motor and a stop contact, said relay having a control coil control by said control means so as to be connected to said motor armature when said stop contact is actuated so as to then place said relay in picked-up condition during a braking interval in which the regenerative voltage of said motor armature remains above a given low value, a braking resistor connected with and controlled by said circuit means so as to be attached across said motor armature when said relay is in said picked-up condition, and interlock means connecting said relay with said control means for causing the latter to maintain said other motor running after the actuation of said stop contact during the period of picked-up condition of said relay and to stop said other motor at the end of said interval.

3. An electric drive system, comprising a direct-current drive motor having an armature and a field winding, a generator having an armature circuit connected to said resistor field winding and having a field circuit provided with an adjusting rheostat for adjusting the speed of said motor, circuit means including a voltage relay and having contact means connected with said motor armature for inserting the latter with said armature circuit when said relay is in dropped-out condition and disconnecting said motor armature from said armature circuit when said relay is in picked-up condition, a braking resistor, contact means forming part of said circuit means and connected with said resistor for attaching it across said motor armature when said voltage relay is in picked-up condition, an alternating current motor in driving connection with said generator armature, a line contactor connected with said alternating-current motor for controlling the latter, control means connected with said contactor and having a start contact for causing said contactor to energize said alternating current motor and a stop contact, said relay having a control coil connectable across said motor armature under control by said control means so as to respond to regenerative voltage from said motor armature after actuation of said stop contact in order to then place said relay in said picked-up condition for an interval in which said regenerative voltage remains above a given low value, and interlock means connecting said relay with said control means for causing the latter to maintain said alternating-current motor energized during said interval.

4. An electric drive system, comprising a direct-current drive motor having an armature and a field winding, a generator having an armature circuit connected to said resistor field winding and having a field circuit provided with an adjusting rheostat for adjusting the speed of said motor, circuit means including a voltage relay and having contact means connected with said motor armature for inserting the latter with said armature circuit when said relay is in dropped-out condition and disconnecting said motor armature from said armature circuit when said relay is in picked-up condition, a braking resistor, contact means forming part of said circuit means and connected with said resistor for attaching it across said motor armature when said voltage relay is in picked-up condition, another motor in driving connection with said generator armature, a line contactor connected with said other motor for controlling the latter, a control relay having a self-holding coil circuit provided with respective start and stop contacts, said control relay and said voltage relay having respective control contacts connected in parallel relation to each other to said line contactor so that the latter causes energization of said other motor when either relay is in picked-up condition, said voltage relay having a control coil connected across said motor armature under control by said control relay so as to respond to regenerative voltage from said motor armature when said control relay is in dropped-out condition in order to then maintain said other motor energized when said regenerative voltage drops below a given low value.

5. An electric drive system, comprising a direct-current drive motor having an armature and a field winding, a generator having an armature circuit connected to said motor field winding and having a field circuit provided with an adjusting rheostat for adjusting the speed of said motor, a field resistor, a relay means having contacts attached to said motor armature and to said field resistor respectively for selectively inserting said motor armature or said field resistor in said armature circuit, a braking resistor, a voltage relay connected with said braking resistor for attaching it across said motor armature when said voltage relay is in picked-up condition, another motor in driving connection with said generator armature, a line contactor connected with said other motor for controlling the latter, a control relay having a self-holding coil circuit provided with respective start and stop contacts, said control relay and said voltage relay having respective control contacts connected in parallel relation to each other to said line contactor so that the latter causes energization of said other motor when either relay is in picked-up condition, said control relay and said voltage relay being interlocked with said relay means so as to cause the latter to pick up said control relay and to drop out when said voltage relay picks up, said voltage relay having a control coil connected across said motor armature under control by said control relay so as to pick up in response to regenerative voltage from said motor armature when said control relay drops out due to actuation of said stop contact in order to then maintain said other motor energized with said two resistors in operation until said regenerative voltage drops below a minimum value.

6. An electric drive system, comprising a direct-current drive motor having an armature and a field winding, a generator having an armature and a field winding series-connected to said motor field winding, a speed-adjusting rheostat associated with said generator field winding, a field resistor, a first relay having two contacts for selectively connecting said motor armature or said field resistor in series with said motor field winding, a braking resistor, a voltage relay connected with said braking resistor for attaching it across said motor armature when said voltage relay is in picked-up condition, an alternating-current motor in driving connection with said generator armature, a line contactor connected with said alternating-current motor for controlling the energization of the latter, a control relay having a self-holding coil circuit provided with respective start and stop contacts, said control relay and said voltage relay having respective control contacts connected in parallel relation to each other to said line contactor so that the latter causes energization of said other motor when either relay is in picked-up condition, said first relay having a self-holding coil circuit, said control relay having an interlock contact for closing said latter coil circuit when said control relay picks up, said voltage relay having an interlock contact for opening said latter coil circuit when said voltage relay picks up, said voltage relay having a control coil connected across said motor armature under control by said control relay so as to pick up in response to regenerative voltage from said motor armature when said control relay drops out due to actuation of said stop contact in order to then maintain said alternating-current motor energized with said two resistors in operation until said regenerative voltage drops below a minimum value.

7. An electric drive system, comprising a direct-current drive motor to operate at adjustable speed having an armature and a field winding, an adjustable-voltage generator having an armature circuit and a field winding series-connected in said circuit and provided with a field rheostat for adjusting the speed of said motor, a field rheostat normally disconnected from said circuit, a braking rheostat normally disconnected from said motor armature, relay means having two relay conditions, one for series-connecting said motor armature in said circuit and another for disconnecting said motor armature from said circuit while connecting said field resistor in said circuit and said braking resistor across said motor armature, drive means for said generator, control means for said drive means having a start contact and a stop contact for respectively starting and stopping the drive system and being connected to said relay means so as to cause said relay means to assume said one condition when said start contact is actuated and to assume said other condition when said stop contact is actuated, and a voltage relay associated with said control means and with said relay means to form a common part of both, said voltage relay having a control coil connected across said motor armature to be responsive to regenerative voltage from said motor armature and having contact means for causing said drive means to stop and said resistors to be disconnected when said regenerative voltage drops below a minimum value.

FREDERICK D. SNYDER.